(12) United States Patent
Wahl et al.

(10) Patent No.: US 8,850,239 B2
(45) Date of Patent: Sep. 30, 2014

(54) METHOD OF CONTROLLING A NETWORK COMPUTING CLUSTER PROVIDING IT-SERVICES

(75) Inventors: Stefan Wahl, Schwieberdingen (DE); Markus Bauer, Pegnitz (DE)

(73) Assignee: Alcatel Lucent, Boulogne-Billancourt (FR)

( * ) Notice: Subject to any disclaimer, the term of this patent is extended or adjusted under 35 U.S.C. 154(b) by 343 days.

(21) Appl. No.: 13/376,550

(22) PCT Filed: Jun. 18, 2010

(86) PCT No.: PCT/EP2010/058634
§ 371 (c)(1),
(2), (4) Date: Dec. 6, 2011

(87) PCT Pub. No.: WO2010/149590
PCT Pub. Date: Dec. 29, 2010

(65) Prior Publication Data
US 2012/0084428 A1    Apr. 5, 2012

(30) Foreign Application Priority Data
Jun. 24, 2009   (EP) ..................................... 09290484

(51) Int. Cl.
*G06F 1/00*    (2006.01)
*G06F 9/46*    (2006.01)
*H02J 3/00*    (2006.01)
*H02J 3/14*    (2006.01)

(52) U.S. Cl.
CPC H02J 3/14 (2013.01); *Y04S 20/222* (2013.01); H02J 3/005 (2013.01); *Y02B 70/3225* (2013.01)
USPC ........... 713/300; 709/201; 718/100; 718/102; 718/104

(58) Field of Classification Search
CPC ...... Y02B 70/14; Y02B 70/3225; H02J 3/005
USPC ............ 713/300; 709/201; 718/100, 102, 104
See application file for complete search history.

(56) References Cited

U.S. PATENT DOCUMENTS

| | | |
|---|---|---|
| 7,313,465 B1 | 12/2007 | O'Donnell |
| 2005/0071092 A1 | 3/2005 | Farkas et al. |
| 2005/0285574 A1 | 12/2005 | Huff et al. |

(Continued)

FOREIGN PATENT DOCUMENTS

GB        2415809 A    1/2006

OTHER PUBLICATIONS

International Search Report and Written Opinion of the International Searching Authority.

*Primary Examiner* — Mark Connolly
(74) *Attorney, Agent, or Firm* — Harness, Dickey & Pierce

(57) ABSTRACT

The network computing cluster includes one or more network computing stations and one or more power autarkic network computing stations supplied by one or more associated local power generators. The power autarkic network computing stations and the local power generators are connected with a local power network. A control signal is sent to a resource managing unit of the network computing cluster via a communication network. The control signal indicates the ability of the power autarkic network computing stations to process IT-services. The resource managing unit receives the control signal via the communication network. Triggered by the control signal, the resource managing unit sends a signal for transferring an IT-service processed by a network computing station of the network computing stations to the network computing station via the communication network. The processed IT-service is transferred to one of the power autarkic network computing stations via the communication network.

12 Claims, 3 Drawing Sheets

(56) References Cited

U.S. PATENT DOCUMENTS

| | | |
|---|---|---|
| 2005/0286179 A1 | 12/2005 | Huff et al. |
| 2006/0276938 A1 | 12/2006 | Miller |
| 2007/0276547 A1 | 11/2007 | Miller |
| 2008/0004721 A1 | 1/2008 | Huff et al. |
| 2009/0265568 A1 * | 10/2009 | Jackson ........................ 713/320 |

* cited by examiner

METHOD OF CONTROLLING A NETWORK COMPUTING CLUSTER PROVIDING IT-SERVICES

BACKGROUND OF THE INVENTION (1) Field of Invention

The present invention relates to a method of controlling a network computing cluster providing IT-services (IT=information technology) and to a power autarkic network computing station of the network computing cluster.

(2) Description of the Related Art

The present invention is motivated by an increasing need of, preferably electrical, power. Providing of power to reasonable costs is one of the key challenges we face on our way forward, when fossil fuels come slowly to an end and overcoming atmospheric pollution is essential for mankind due to global warming.

Due to these above mentioned challenges we currently see how electrical utility companies start to adapt their power generation towards regenerative energy sources, so-called green energy sources. In addition new companies and even today's energy "end consumers", e.g. by setting up photovoltaic units on the roofs of their houses, enter the renewable energy market as power suppliers. Consequently with this change in power generation also power transmission will see a fundamental change in the future. The transmission networks, i.e. the power grid, must be adapted to the inherent decentralized nature of green power generation, i.e. the power generation based on green energy sources. However, this is different to today's transmission network design, which is optimized for centralized power generation approaches based on huge power plants. In the future power production will be likely much more distributed and there will also be a huge variation in capacity between the different kinds of electrical power "plants" ranging from e.g. small photovoltaic or Block-Type Thermal Power Stations installations to huge off-shore wind parks.

There are many issues which come with the introduction of distributed large scale green power production deployments. Some of the most important are:

(i) The network must deal with a large number of, preferably different, power sources for which a prediction of power injection in the power grid by these power sources is difficult. The prediction of power injection can not be done in the way it is possible with today's fully controlled power plants. Therefore keeping the transmission network in a stable state becomes much more challenging.

(ii) Generated power from regenerative energy sources, e.g. green energy sources, is not always available at the location where it is needed. One example in Germany are wind parks which are mainly installed in the northern part of the country as more wind is available at the coastline. But power consumption is much higher in the southern part of Germany. This requires the transport of power over large distances what comes with high transmission losses.

(iii) It is in the nature of many regenerative energy sources that there can be a huge variation in the amount of generated power. One example is a wind energy plant which can have huge variations in generated power in the middle of a thunderstorm—a state of power over production—and after it died down within minutes—a state of power production producing too less power—to keep the transmission network in a stable state.

(iv) Due to the huge variation in the production of "green" generated power, the power grid operators have to install and/or allocate stand-by electrical power sources from conventional electrical power generators to compensate the delivery variations.

There are many activities which should help to reduce the impact of adding these new power sources to the transmission network, for instance extending transport capacities in the power grid, switching to DC (DC=direct current) for transmission over long distances, building new "power storages" like pumped-storage power stations. Many technologies are developed which should help to efficiently transport regenerative energy from the location where it is generated to the location where it is used even in cases when there are huge variations of power generation fluctuation in the network. However, a drawback of these approaches can be seen in the issue that any transport of electrical power comes with transmission losses, unfortunately also leading to higher electricity costs. The transmission losses and consequently also the electricity costs are increasing when the need for power is increasing.

It is the object of the present invention to improve the controlling of a network computing cluster.

SUMMARY OF THE INVENTION

The object of the present invention is achieved by a method for controlling a network computing cluster providing IT-services, the network computing cluster comprising one or more network computing stations and one or more power autarkic network computing stations supplied by one or more associated local power generators, the one or more power autarkic network computing stations and the one or more local power generators being connected with a local power network, an amount of locally generated power generated by the one or more local power generators is determined, dependent on the amount of locally generated power a control signal is sent to a resource managing unit of the network computing cluster via a communication network, the control signal indicating the ability of the one or more power autarkic network computing stations to process IT-services, the resource managing unit receives said control signal via the communication network, the resource managing unit sends a signal for transferring an IT-service processed by a network computing station of the one or more network computing stations to said network computing station via the communication network, the sending of the signal for transferring said IT-service is triggered by said control signal, and said IT-service processed by said network computing station is transferred to one of the one or more power autarkic network computing stations via the communication network for further processing the IT-service. The object of the present invention is also achieved by a network computing cluster providing IT-services, the network computing cluster comprising a control unit, a resource managing unit, one or more network computing stations and one or more power autarkic network computing stations supplied by one or more associated local power generators, the one or more power autarkic network computing stations and the one or more local power generators being connected with a local power network, wherein the control unit is adapted to determine an amount of locally generated power generated by the one or more local power generators and, dependent on the determined amount of locally generated power, trigger one of the one or more power autarkic network computing stations to send a control signal to the resource managing unit via a communication network, the control signal indicating the ability of the one or more power autarkic network computing stations to process IT-services, and wherein the resource managing unit is adapted to receive said control signal via the communication network, and send, triggered by said control signal, a signal for transferring an IT-service processed by a network computing station of the one or more network computing stations to said network computing station via the communication network for transferring said IT-service processed by said network computing station to the one of the one or more power autarkic network computing stations via the communication network for further processing the IT-service.

The present invention provides a surprisingly different and effective approach-than known form the prior art—to reduce the transmission losses and also the electricity costs wherein at the same time the power grid is stabilized. Embodiments according to the present invention avoid transporting power from a generation location to a distant consumption location, with all the negative aspects mentioned above. Instead, embodiments according to the present invention provide a, preferably temporary, "move" of power consuming tasks, i.e. the processing of IT-services, to currently "hot" locations of power generation, i.e. locations which show an excessive production and/or generation of power. Thereby, the mean distance between the location of generation of power and the consumption of power is reduced and minimized. Furthermore, it is possible for owners of a power autarkic network computing station to avoid any interaction and/or obligations with utilities and/or power providers, since preferably excess power is used for supplying the power autarkic network computing station. The wording "local" specifies the area within the perimeter of the property of the power autarkic network computing stations and local power generators, e.g. a private household, a subdivision of a power grid owned by a utilities provider, a commercial building, a manufacturing shop or plant, facilities or buildings owned by the utilities provider. The wording "power autarkic network computing station" refers to network computing stations which can be supplied with power generated by an associated local power generator and thereby the power autarkic network computing station is independent from the power grid.

Furthermore, it is possible that the transfer of an IT-service is realized by a live migrating procedure. The signal for transferring the IT-service informs said network computing station about the one of the one or more power autarkic network computing station which will further process the IT-service. Data required for further processing the IT-service is copied to the one of the one or more power autarkic network computing station while the IT-service is still being processed by said network computing station. After the process of copying the data is finished, the IT-service is interrupted and transferred to the one of the one or more power autarkic network computing station, preferably together with additional data indicating changes of data which occurred during the copying process. Then, routing data required for further processing the IT-service can be updated at the one of the one or more power autarkic network computing station and/or in the communication network. Thereby, it is possible that the transfer or the live migration of an IT-service is executed seamless, i.e. the interrupt of the processing of the IT-service is short, preferably less than 1 second, and/or the quality of service provided by the IT-service is not affected. In the following, a transfer of an IT-service may be understood as described above.

Consequently embodiments of the present invention provide an overall improvement of the ecological energy balance, as the ecologically produced power is locally consumed—at the location of its production—, in particular without any transport losses, for processing the IT-services.

Additionally, IT-services can be processed more cost efficient by embodiments according to the present invention, since it is possible for owners of the one or more power autarkic network computing stations, which are associated with one or more local power generators and which are connected with a local power network, to use an excess power to power their one or more power autarkic network computing stations. The excess power is locally generated by local power generators. Embodiments of the present invention enable that a power excess generated by a local power generator, which cannot be sold in a direct way, because the power grid is saturated with power, is used to provide power for processing IT-services which are powered with power at no charge. That means the power excess is not wasted and thereby power is conserved. Furthermore, it is possible that local power generator is generating thermal power and/or electrical power, a waste heat of the power autarkic network computing station can be sold and used as thermal power.

According to embodiments of the present invention IT-services, which are processed by network computing stations, can be seamless transferred to power autarkic network computing stations by means of the resource managing unit. Thereby, both, the power distribution throughout the power grid as well as the computational load of the processing of IT-services throughout the network computing cluster, can rapidly adapted to changing of environmental parameters, like the distribution of the generation of power and/or the need for processing IT-services. Consequently, the resource managing unit provides a load balancing functionality regarding the generation of power and/or the processing of IT-services. Preferably, the network computing stations are not supplied by an associated local power generator, but they are supported by the power grid which is not the local power grid. The resource managing unit can be a computer program product executed on one or more of the network computing stations and/or on a designated server node of the network computing cluster. It is also possible that the resource managing unit is a respectively designated network computing station of the network computing cluster.

Furthermore, power grid operators and/or utilities provider have not to spent spare energy generators to backup the unstable energy provisioning of the green technologies, like photovoltaic, wind energy, etc.

In particular, in cases when the associated local power generator is part of a Block-Type Thermal Power Station, the waste heat of the power autarkic network computing station while processing IT-services can be combined with the heat generated by the Block-Type Thermal Power Station. In such a case there are two further advantages: the power autarkic network computing station while processing IT-services is cooled by reusing the waste heat and furthermore less energy for additional cooling of the power autarkic network computing station is required.

Further advantages are achieved by embodiments of the invention indicated by the dependent claims.

Preferably, the control unit for determining an amount of locally generated power by the one or more local power generators is a control unit of a local power generator of the one or more local power generators and/or a local power controller of the one or more power autarkic network computing stations. It is possible, that triggering one of the one or more power autarkic network computing stations to send the control signal is initiated by a switching-on of the one of the one or more power autarkic network computing stations and/or by a switching-on of a local power generator of the one or more local power generators supplying the one of the one or more power autarkic network computing stations.

According to a preferred embodiment of the invention a control unit associated with the local power network retrieves the amount of locally generated and consumed power measured by a power sensor. Preferably, the power sensor is a wattmeter. The control unit calculates an amount of local power excess based on a difference of the measured amount of locally generated and consumed power. The consumed power is required power which is not available for processing IT-serves, but required differently. Further, the control unit triggers the sending of the control signal indicating the ability of the one or more power autarkic network computing stations to process IT-services, when the difference of the measured amount of locally generated and consumed power a predefined threshold level is reached or exceeded. The one or more power autarkic network computing stations are associated with the one or more local power generators. Preferably, the predefined threshold level is power value which equals at least a minimum power required for processing at least to one IT-service.

It is alternatively also possible, that a control unit associated with the local power network retrieves the amount of locally generated measured by a power sensor and a load of the one or more local power generators measured by the power sensor for determining the amount of locally generated power. The control unit calculates the amount of local power excess based on a difference of the measured amount of locally generated power and the measured load. The load is measured of the consumed power. Further, as above described, the control unit triggers the sending of the control signal indicating the ability of the one or more power autarkic network computing stations associated with the one or more local power generators to process IT-services, when the difference of the measured amount of locally generated and consumed power exceeds the predefined threshold level.

According to a preferred embodiment of the invention the control signal comprises the amount of local power excess. However, it is not required that the control signal comprises the amount of local power excess. In case, that the control signal does not comprises the amount of local power excess, the controls signal indicates that the amount of power is sufficient for booting one power autarkic network computing stations associated with the one or more local power generators and/or for processing one IT-service or is sufficient for processing a number of IT-services corresponding to a predefined threshold level which can be used for triggering said control signal. Embodiments of the present invention, which providing a control signal comprising the amount of local power excess, show a higher variability regarding a load balance for processing IT-services throughout the network computing cluster.

According to a preferred embodiment of the invention the predefined threshold level indicates a minimal amount of local power excess required for processing of at least one IT-service.

According to a preferred embodiment of the invention, in dependence of the amount of local power excess comprised in the control signal, the one or more power autarkic network computing stations providing the ability to process IT-services are rated by assigning an ecological value to each of the one or more power autarkic network computing stations. For instance, the ecological value may be related to a carbon dioxide emission rate characterizing the one or more power autarkic network computing stations and/or the one or more associated local power generators. It is possible, that the ecological value related to the carbon dioxide emission rate is a reciprocal value of the carbon dioxide emission rate. That means, it is possible that only the one or more power autarkic network computing stations are rated, wherein the one or more power autarkic network computing stations providing an amount of local power excess which exceeds the predefined threshold level and/or which is sufficient for processing of at least one IT-service. Then, the resource managing unit selects the one of the one or more power autarkic network computing stations for further processing the IT-service which provides a highest or better ecological value. Thereby, it is possible to reduce global warming.

According to a preferred embodiment of the invention the resource managing unit evaluates the one or more power autarkic network computing stations for further processing the IT-service. The evaluation is based on one or more parameters associated with the one or more power autarkic network computing stations. The one or more parameters are selected from a group of the one or more parameters comprising the amount of local power excess and/or an ecological value. It is possible, that the group of one or more parameters comprises a power grid provider specific value associated with the one or more local power generators, which can indicate a limit of power, preferably for a predefined period of time, disposable by the one or more local power generators. The resource managing unit selects the one of the one or more power autarkic network computing stations for further processing the IT-service which provides a best evaluation based on the one or more parameters. For instance, the power autarkic network computing stations for further processing the IT-service which provides the best evaluation is determined by an evaluation which evaluates a mathematical function of the one or more parameters. Preferably, the mathematical function of the one or more parameters is a sum, a product or a maximum of the one or more parameters. Thereby, the power autarkic network computing stations for further processing the IT-service which provides the best evaluation provides a highest or better ecological value when the evaluation is based on at least the ecological value.

According to a preferred embodiment of the invention a local resource management client of the one of the one or more power autarkic network computing stations receives a status signal comprising the amount of local power excess via the communication network by means of communication means of the one of the one or more power autarkic network computing stations and the amount of local power excess from the received status signal is extracted. It is possible, that the resource management client is a computer program product executed on the one or more power autarkic network computing station and/or a hardware means, e.g. a control unit, included in the one or more power autarkic network computing station. Preferably, the local resource management client extracts from the received status signal the amount of local power excess. The local resource management client compares a number of two or more IT-services processed by a processing unit with a number of one or more powered-on processing blades of the one of the one or more power autarkic network computing stations. By means of the processing blades of the processing unit it is possible to process one or more IT-services in parallel. Preferably, a processing blade comprises at least a central processing unit, a memory for storing data and an input-output control unit. Further-on, the local resource management client prompts a local power controller to switch on or to switch off one or more processing blades of the one or more processing blades, respectively such that the number of one or more powered-on processing blades equals a minimum of a number of all processing blades of the processing unit, the number of the two or more IT-services processed by processing unit, and/or a floor of the amount of local power excess and an power consumption of one of the one or more powered-on processing blades multiplied with a factor of at least one. The floor is a mathematical function which maps a real number to the next smallest integer number. Furthermore, the floor of the amount of power excess and the power consumption of one of the one or more powered-on processing blades multiplied with a factor of at least one defines a threshold value of minimum value of power excess necessary for processing at least one IT-service. Thereby, a maximum performance for processing IT-services can be achieved by means of such an embodiment of the invention, wherein at the same time the power consumption for processing IT-services is reduced.

According to a preferred embodiment of the invention a local power controller of the one of the one or more power autarkic network computing stations controls a supply of power to a processing unit of the one of the one or more power autarkic network computing stations based on an energy demand of the processing unit and based on responses to frequent queries regarding an amount of locally generated power. The processing unit of the one of the one or more power autarkic network computing stations comprises one or more processing blades. The amount of locally generated power is generated by the one or more local power generators. A power sensor, preferably a wattmeter, measures the amount of locally generated power. An accumulator of the one of the one or more power autarkic network computing stations is charged with power generated by the one or more local power generators while there is a power excess generated by the one or more local power generators. The accumulator is discharged while the energy demand is higher than the power generated by the one or more local power generators in order to provide a constant supply of power to the processing unit. It is possible to determine the power excess generated by the one or more local power generators as a difference of the energy demand of the processing unit and the responses to frequent queries regarding an amount of locally generated power for a predefined time period. Preferably, the predefined time period comprises 1 second to 10 minutes. Thereby, it is possible to guarantee a constant power supply to the processing unit which enhances the quality of processing IT-services. Without buffering by means of the accumulator the locally generated power, a constant power supply of the processing unit can not be assured when the amount of locally generated power depends on fluctuating environmental parameters. Such fluctuating environmental parameters are for instance wind force, wind direction, sunshine duration, cloudiness, and/or tides.

According to a preferred embodiment of the invention a local resource management client of the one of the one or more power autarkic network computing stations receives a power-off signal. Preferably, power-off signal is received from a power switch. The power switch can be activated by an owner of the one or more local power generators. It is possible that the owners of the one or more power autarkic network computing stations and the one or more associated local power generators are identical or different. The local resource management client initiates a transfer of all IT-services processed by a processing unit of the one of the one or more power autarkic network computing stations. The local resource management client queries, preferably the resource managing unit, for one or more other network computing stations of the one or more network computing stations and/or for one or more other network computing station of the one or more power autarkic network computing stations which can take over said IT-services via the communication network for further processing said IT-services by means of communication means of the one of the one or more power autarkic network computing stations. Said IT-services are transferred, preferably to the resource managing unit, the one or more other network computing station another and/or the one or more other network computing station, according to a result of the query received from resource managing unit. The result of the query comprises one or more other network computing stations and/or one or more other power autarkic network computing station which have the ability and/or a power to further process one or more of said IT-services. Preferably, the one or more other network computing stations and/or the one or more other power autarkic network computing stations are powered by renewable energy. The local resource management client signals to the resource managing unit via the communication network that the one of the one or more power autarkic network computing stations is switched-off in order to indicate that the one of the one or more power autarkic network computing stations is performing a shutdown procedure. The local resource management client prompts a local power controller of the one of the one or more power autarkic network computing stations to switch off the one of the one or more power autarkic network computing stations. That means, before the one of the one or more power autarkic network computing stations gets switched-off a live migration of the running processes, i.e. the IT-services, is performed. The location, i.e. the one of the one or more power autarkic network computing stations, where these running processes are transferred to is received from the resource managing unit. The shutdown procedure is started as soon as all processes are migrated successfully. Thereby, it is possible to terminate the processing of IT-service without restarting the processing of the IT-services at another of the one or more power autarkic network computing stations or a network computing stations. The resource managing unit can assign a different power autarkic network computing station or a network computing station for seamless further processing the IT-services. Consequently, processing time for processing IT-services and power consumption can be reduced.

According to a preferred embodiment of the invention an accumulator charge condition sensor of an accumulator charged by the one or more associated local power generators signals an accumulator charge condition value sensed by the accumulator charge condition sensor to a local power controller of the one of the one or more power autarkic network computing stations. A local resource management client of the one of the one or more power autarkic network computing stations signals a number of IT-services processed by a processing unit of the one of the one or more power autarkic network computing stations to the local power controller. The local power controller initiates a standby-mode of the one of the one or more power autarkic network computing stations in case that the number of IT-services processed by a processing unit equals zero and the sensed accumulator charge condition value indicates a fully charged accumulator. The processing unit of the one of the one or more power autarkic network computing stations is not powered during standby-mode. Thereby, it is possible conserve power while there is no need for processing IT-services and/or charging the accumulator.

It is also possible, that a local resource management client of the one of the one or more power autarkic network computing stations signals a number of IT-services processed by a processing unit of the one of the one or more power autarkic network computing stations to the local power controller. The local power controller initiates a standby-mode of the one of the one or more power autarkic network computing stations in case that the number of IT-services processed by a processing unit equals zero. The processing unit of the one of the one or more power autarkic network computing stations is not powered during standby-mode. Consequently, it is possible conserve power while there is no need for processing IT-services.

According to a preferred embodiment of the invention the resource managing unit assigns one or more further IT-services to the one and/or another of the one or more power autarkic network computing stations, the one and/or the other of the one or more power autarkic networks computing station comprising a processing unit with one or more processing blades for processing the one or more further IT-services, via the communication network. A local resource management client of the one and/or the other of the one or more power autarkic network computing stations instantiates at one of the one or more processing blades the one or more further IT-services for processing the one or more further IT-services.

Preferably, for assigning the one or more further IT-service, local resource management clients of two or more power autarkic network computing stations signal local power excess values sensed with a power sensor of the one or more associated local power generators generating the local power excess to the resource managing unit via the communication network by means of communication means. The two or more power autarkic network computing stations comprise at least the one and the other power autarkic network computing station. Furthermore, the two or more power autarkic network computing stations are power autarkic network computing stations of the one or more power autarkic network computing stations associated with the one or more associated local power generators generating local power excess. The resource managing unit selects the power autarkic network computing station as the one of the two or more power autarkic network computing stations associated with the one or more local power generators generating the local power excess providing a highest ecological value. Each of the two or more power autarkic network computing stations is rated with an ecological value specified by a number.

Furthermore, for selecting the power autarkic network computing station as the one of the two or more power autarkic network computing stations providing the highest ecological value, it is possible that the resource managing unit accesses a list of one or more ecological values rating respectively the one or more power autarkic network computing stations. The list of one or more ecological values can be stored at a database associated resource managing unit. The resource managing unit extracts form the list of one or more ecological values the respective ecological value for each of the two or more power autarkic network computing stations associated with the one or more local power generators generating the local power excess. The resource managing unit compares the extracted ecological values for selecting the power autarkic network computing station as the one of the two or more power autarkic network computing stations providing the highest ecological value. It is also possible, that the resource managing unit accesses a further list of one or more rating-values rating respectively the one or more power autarkic network computing stations. For instance, the further list of one or more rating-values rates respectively the quality of processing IT-services by the one or more power autarkic network computing stations. It is possible, that only power autarkic network computing stations can be selected which provide a predefined minimum quality of processing IT-services or which provide a non-degraded quality of processing IT-services.

According to a preferred embodiment of the invention said network computing station receives the signal for transferring said IT-service processed by said network computing station via the communication network by means of communication means of said network computing station. Said network computing station sends to the resource managing unit a confirmation signal comprising status data of said IT-service via the communication network. The resource managing unit receives the confirmation signal comprising the status data of said IT-service. The resource managing unit forwards the status data of said IT-service to the one of the one or more power autarkic network computing stations for the further processing the IT-service via the communication network. By means of the status data of said IT-service it is possible to seamless further process said IT-service by a processing unit of the one of the one or more power autarkic network computing stations. It is possible to understand "transferring said IT-service" as "live migrating said IT-service". The data required for further processing said IT-service can comprise the status data of said IT-service.

BRIEF DESCRIPTION OF THE DRAWINGS

These as well as further features and advantages of the invention will be better appreciated by reading the following detailed description of presently preferred exemplary embodiments taken with the accompanying drawings of.

DETAILED DESCRIPTION OF EXAMPLE EMBODIMENTS

Figure 1:
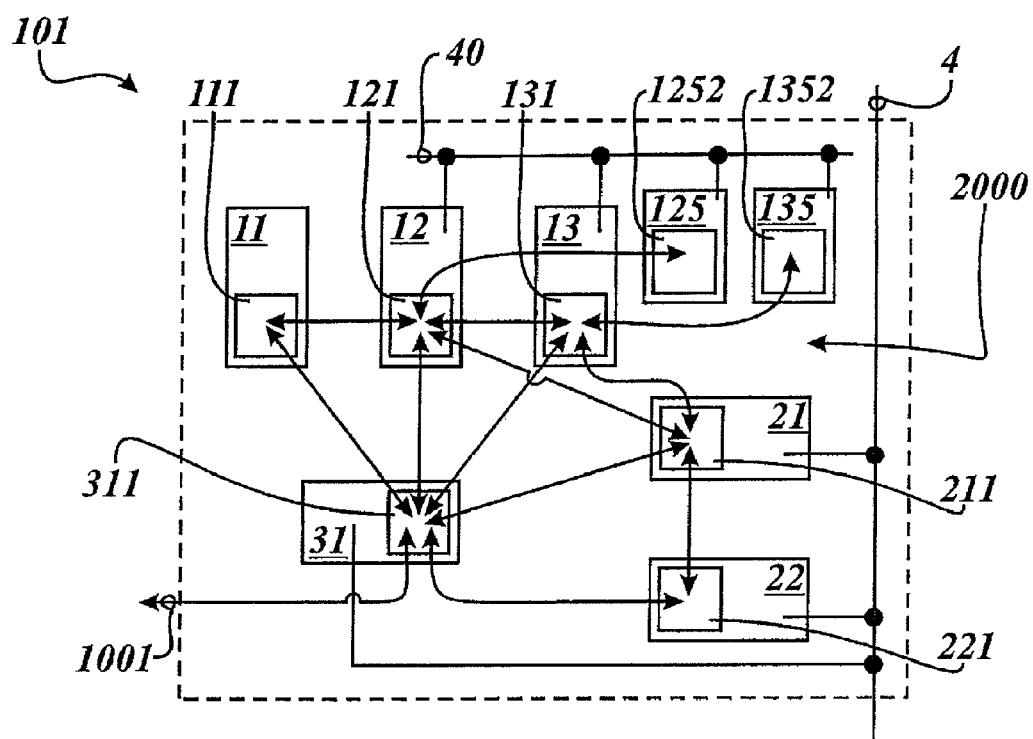
FIG. 1 shows a schematic sketch of a network computing cluster.

FIG. 1 shows a schematic sketch of a network computing cluster 101 providing IT-services. The network computing cluster 101 comprises three network computing stations 21, 22, 31 and three autarkic network computing stations 11, 12, 13. The two autarkic network computing stations 12, 13 are supplied by two associated local power generators 125, 135. The power autarkic network computing station 11 comprises a local power generator (not shown). Preferably, in contrast to the one or more network computing stations 21, 22, 31, the one or more power autarkic network computing stations 11, 12, 13 are not connected to an external power supplier. The two local power generators 125, 135 are connected with a local power network 40. The three network computing stations 21, 22, 31 are connected with a power network 4 which is not connected in a direct way with the local power network 40. Further, the network computing station 31 is designated as a resource managing unit 31. The three network computing stations 21, 22, 31 and the three power autarkic network computing stations 11, 12, 13 comprise communication means 211, 221, 311, 111, 121, and 131, respectively. The two local power generators 125 and 135 comprise control units 1252 and 1352, respectively providing functionality of communication means.

The three network computing stations 21, 22, 31, the three power autarkic network computing stations 11, 12, 13 and the two local power generators 125, 135 communicate—indicated by left-right arrows—via a communication network 2000. Furthermore, the network computing station 31 may communicate a via further communication network 1000. The communication means 211, 221, 311, 111, 121, 131 and control units 1252, 1352 can provide communication techniques based on one or more of the following carriers techniques copper and/or fiber, radio, and/or optical link. Preferably, the communication means 211, 221, 311, 111, 121, 131 and control units 1252, 1352 provide an IP-packed based communication protocols (IP=Internet Protocol) as well as an TCP/IP stack (TCP=transmission control protocol). Radio and optical link are preferred carriers techniques when the power autarkic networking station is located in areas where only environmental energy, like wind energy, solar energy, tidal energy, etc., is available, but no communication network based on wire and/or fiber carrier techniques is available.

The local power generators 125, 135 are power generators which produce power from one or more energy resource selected from the group wind energy, solar energy, tidal energy, geo thermal energy. It is also possible that the local power generators 125, 135 are Block Type Thermal Power Stations. Preferably, the local power generators 125, 135 provide electrical power with low voltage in the range of 200 V to 700 V via the local power network 40. It is possible that the power network 4 provides electrical power with a medium or high voltage in the range of 6 kV to 30 kV or 50 kV to 150 kV, respectively. A current transformer can be interconnect between the power network 4 and the local power network 40.

The network computing cluster 101 providing IT-services a seamless transfer of the IT-services while being processed from one network computing station 21, 22, 31 or one power autarkic network computing station 11, 12, 13 to another of the network computing stations 21, 22, 31 and the power autarkic network computing stations 11, 12, 13, and visa versa. In particular also the resource managing unit 31 can process IT-services.

A live migration process of an IT-service being processed, i.e. the seamless transfer of the IT-service is as follows:

An amount of locally generated power generated by one or both local power generators 125, 135 is determined, preferably by means of a wattmeter of the two local power generators 125, 135. In dependence of the amount of locally generated power, a control signal is sent to a resource managing unit 31 of the network computing cluster 101 via a communication network 2000. For instance, the amount of locally generated power exceeds a predefined threshold level and/or is sufficient for processing at least one IT-service. Also, analogously, the power autarkic network computing station 11 may send a control signal to the resource managing unit 31. The control signal comprises the amount of locally generated power. The control signal further indicates the ability of the power autarkic network computing stations 11, 12, 13 to process IT-services. The resource managing unit 31 receives said control signal via the communication network 2000. Triggered by said control signal the resource managing unit 31 sends a signal for transferring an IT-service processed by a network computing station, e.g. the network computing stations 21, to said network computing station via the communication network 2000. Finally, the resource managing unit 31 transfers said IT-service processed by said network computing station 21 to one of the one or more power autarkic network computing stations 11, 12, 13, e.g. the power autarkic network computing station 11, via the communication network 2000 for further processing the IT-service. Preferably, the process of transferring an IT-service is a live migration process of the IT-service which provides a seamless transfer of the IT-service, i.e. a transfer of the IT-service not compromising quality of the IT-service, form one network computing station or power autarkic network computing station to another network computing station or power autarkic network computing station.

Figure 2A:
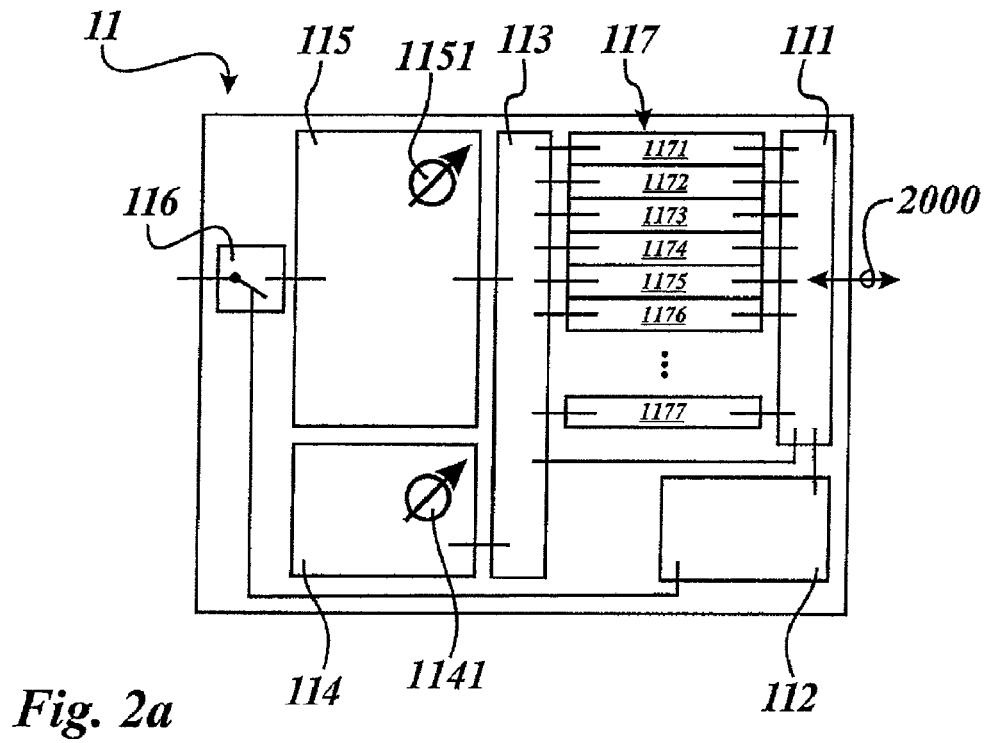
FIG. 2a shows a schematic sketch of a first preferred embodiment of a power autarkic network computing station with an associated local power generator.

FIG. 2a shows a schematic sketch of a first preferred embodiment of a power autarkic network computing station 11 with an associated local power generator 115. The power autarkic network computing station 11 comprises the local power generator 115, an accumulator 114, a local power controller 113, a processing unit 117 with several processing blades 1171, 1172, 1173, 1174, 1175, 1176, 1177, a communication means 111, a local resource management client 112, and a switch 116. The local power generator 115 can be switched on or off by the switch 116 and can be controlled by the local power controller 113. The local power generator 115 comprises further a power sensor 1151 allowing determining locally generated power, consumed power and/or load of the local power generator 115. The is accumulator 114 comprises an accumulator charge condition sensor 1141. The accumulator 114 can be controlled by local power controller 113. The local power controller 113 controls the processing unit 117 and the processing blades 1171, 1172, 1173, 1174, 1175, 1176, 1177. Communication between the devices local power controller 113, the processing unit 117 and the processing blades 1171, 1172, 1173, 1174, 1175, 1176, 1177, and the local resource management client 112 as well as communication via the communication network 2000 is provided by the communication means 121. The local power network is provided by the local power controller 113. The power autarkic network computing station 11 is not connected to an external or further power network. Furthermore, the local resource management client 112 senses the state of the switch 116 and controls the switch 116. Thereby, the local resource management client 112 can delay a powering-off procedure of the local power generator 115 until all IT-services processed by the processing unit 117 are interrupted and transferred to the resource managing unit 31 and the local power generator 115 and the processing unit 117 can safely powered-off. However, a delay of the powering-off procedure of the local power generator 115 may only be required if there is no accumulator 114 which can provide during the transfer of the IT-processes the thereto necessary power to the power autarkic network computing station 11. It is also possible that the power autarkic network computing station is connected to the power network 4 and/or the local power network 40. Thereby, in cases where an accumulator 114 is not present or the accumulator 114 is not sufficiently charged auxiliary power provided via the power network 4 and/or the local power network 40 can be used during the transfer of the IT-processes. Also in such a case no delay of the powering-off procedure of the local power generator 115 is required.

In particular, in cases where the local power generator is a Block Type Thermal Power Station, the local power controller 113 is controlling the electrical power generated by the local power generator 115 as well as the heat generated by the local power controller 115 and the heat generated by the processing unit 117. In this case, the waste heat generated processing unit 117 is combined with the heat generated by the local power controller 113 as thermal power output of the Block Type Thermal Power Station. The waste heat of the processing unit 117 can be used for heating a building or can be sold as thermal power.

Figure 2B:
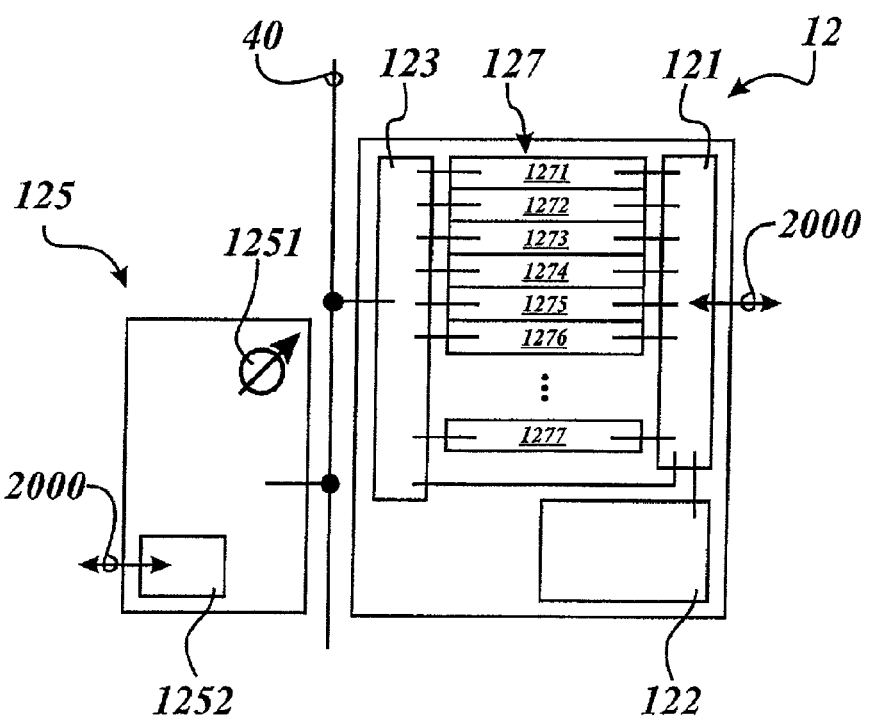
FIG. 2b shows a schematic sketch of a second preferred embodiment of a power autarkic network computing station with an associated local power generator.

FIG. 2b shows a schematic sketch of a second preferred embodiment of a power autarkic network computing station 12 with an associated local power generator 125. The power autarkic network computing station 12 is similar to that of the first embodiment. The local power generator 125 is connected with power autarkic network computing station 12 via and/or with a local power network 40. The power autarkic network computing station 12 comprises a local power controller 123, a processing unit 127 with several processing blades 1271, 1272, 1273, 1274, 1275, 1276, 1277, a communication means 121, and a local resource management client 122. The local power generator 125 can be controlled by the local power controller 123 via the local power network 40. The local power generator 125 comprises a power sensor 1251 allowing determining locally generated power, consumed power and/or load of the local power generator 125. Furthermore, it is possible, that the local power generator 125 comprises a control unit 1252 providing communication functionality for communicating via the communication network 2000.

An accumulator comprising an accumulator charge condition sensor is not shown in FIG. 2b, but such an accumulator can be connected to the local power generator 125 and/or the power autarkic network computing station 12 by means of the local power network.

The local power controller 123 controls the processing unit 127 and the processing blades 1271, 1272, 1273, 1274, 1275, 1276, 1277. Communication between the devices local power controller 123, processing unit 127 and the processing blades 1271, 1272, 1273, 1274, 1275, 1276, 1277, and the local resource management client 122 as well as communication via the communication network 2000 is provided by the communication means 121.

Figure 3:
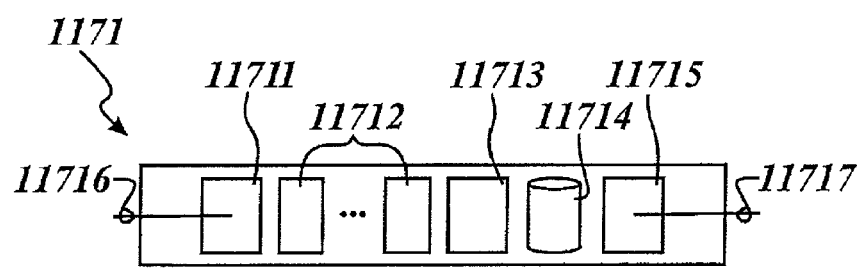
FIG. 3 shows a schematic sketch of a preferred embodiment of a processing blade of a processing unit.

FIG. 3 shows a schematic sketch of a preferred embodiment of the processing blade 1171 of the processing unit 117. The processing blade 1171 comprise one or more devices of the group main board and power supply unit 1171, one or more central processing units 11712, a memory 11713, a hard disc 1174, communication means 11715. Preferably, the main board and power supply unit 1171 comprises a Basic Input Output System and a system bus for interconnecting the one or more devices. The one or more central processing units 11712 comprise one or more processing cores. The memory 11713 can be a Random Access Memory or a solid state disk. The communication means 11715 may provide the same functionality as the communication means of the power autarkic network computing station 11. Furthermore, the processing blade 1171 comprises a first link 11716 for connecting the main board and power supply unit 1171 to the local power controller 117 of the power autarkic network computing station 11, and a second link 11717 for connecting communication means 11715 to the communication means 111 of the power autarkic network computing station 11.

Figure 4:
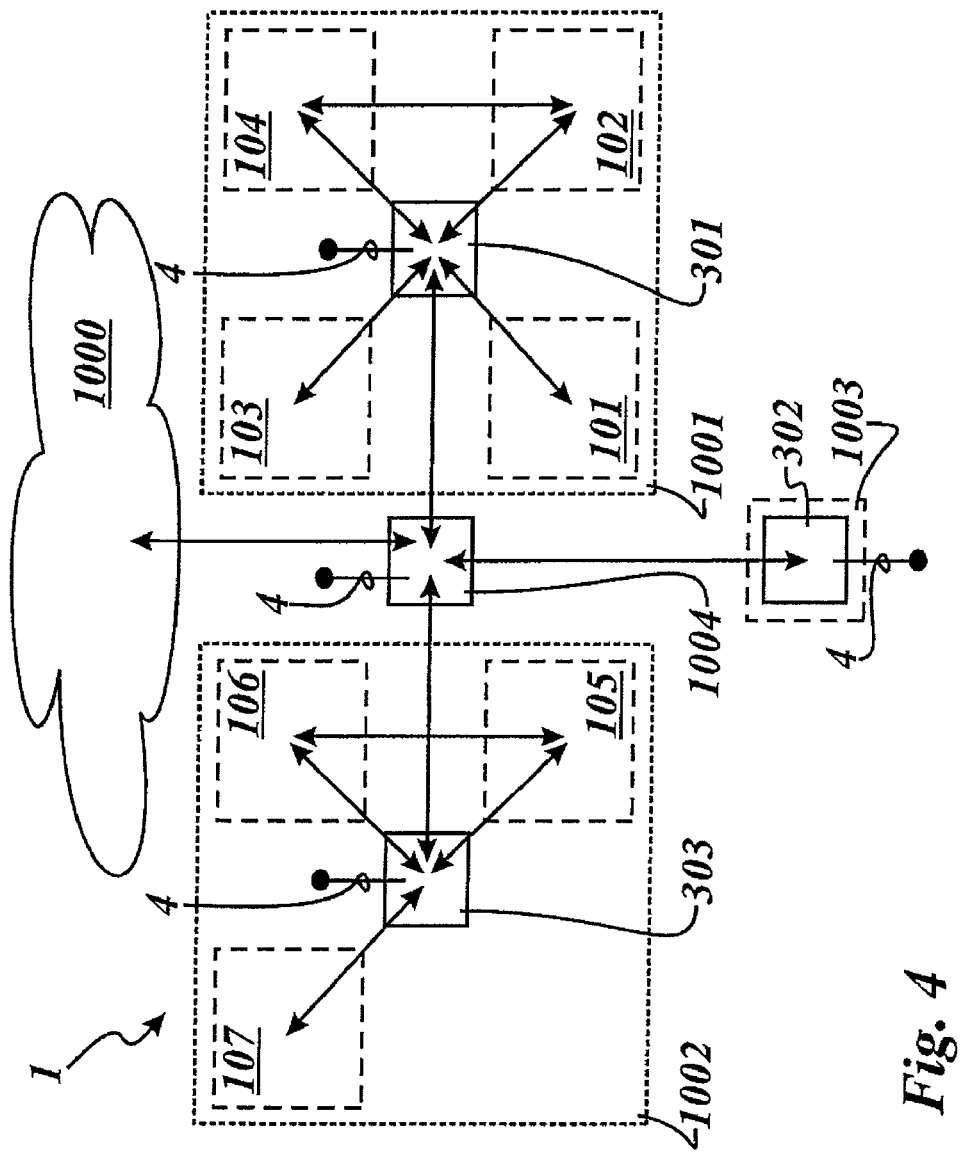
FIG. 4 shows a schematic sketch of a meta network computing cluster.

FIG. 4 shows a schematic sketch of a meta network computing cluster 1. The meta network computing cluster 1 can comprises one or more clusters of network computing clusters 1001, 1002, 1003. The embodiment, as shown in FIG. 4, pictures three clusters of network computing clusters 1001, 1002, 1003. Each cluster of the network computing clusters 1001, 1002, 1003 is connected to the power grid 4. Each cluster of the network computing clusters 1001, 1002, 1003 comprise one or more network computing clusters. In particular, the cluster of network computing clusters 1001 comprises the four network computing clusters 101, 102, 103, 104 and further a resource managing node 301 connected to the power grid 4. The cluster of network computing clusters 1002 comprises the three network computing clusters 105, 106, 107 and further a resource managing node 303 connected to the power grid 4. The cluster of network computing clusters 1003 comprises no network computing cluster, but a resource managing node 302 connected to the power grid 4 and providing the functionality of a network computing station. A master resource managing node 1004 connected to the power grid 4 load balances and administrates the processing of IT-services. The resource managing nodes 301, 303 load balance and administrate the processing of IT-services between their associated network computing clusters 101, 102, 103, 104 and 105, 106, 107, respectively. The thereto necessary communication between the master resource managing node 1004, the resource managing nodes 301, 302, 303, inside the cluster of network computing clusters 1001, 1002, 1003—between network computing clusters 101, 102, 103, 104 and 105, 106, 107 and their respective resource managing nodes 301 and 303, respectively—, and via an Internet 1000 is indicated by left-right arrows. Thereby it is possible, since the network computing clusters 101, 102, 103, 104, 105, 106, 107 comprise one or more network computing stations and one or more power autarkic network computing stations with associated local one or more power generators (not shown), to efficiently distribute between the, possibly wide spread, one or more network computing stations and the one or more power autarkic network computing stations the processing of IT-service such that the processing of IT-services is carried at location showing power excess. Furthermore, in cases that there is a power shortage, i.e. there is no sufficient amount of power for processing IT-services available, it is possible that the resource managing nodes 301, 302, 303 and/or master resource managing node 1004 signals a additional power is required.

The invention claimed is:

1. Method of controlling a network computing cluster providing IT-services, the network computing cluster comprising one or more network computing stations and one or more power autarkic network computing stations supplied by one or more associated local power generators, the one or more power autarkic network computing stations and the one or more local power generators being connected with a local power network, wherein the method comprises determining an amount of locally generated power generated by the one or more local power generators, sending, dependent on the amount of locally generated power, a control signal to a resource managing unit of the network computing cluster via a communication network, the control signal indicating the ability of the one or more power autarkic network computing stations to process IT-services, receiving, by the resource managing unit, said control signal via the communication network, sending, by the resource managing unit and triggered by said control signal, a signal for transferring an IT-service processed by a network computing station of the one or more network computing stations to said network computing station via the communication network, and transferring said IT-service processed by said network computing station to one of the one or more power autarkic network computing stations via the communication network for further processing the IT-service.

2. Method of controlling a network computing cluster providing IT-services according to claim 1, wherein the method comprises:

retrieving, by a control unit associated with the local power network, the amount of locally generated and consumed power measured by a power sensor, calculating, by the control unit, an amount of local power excess based on a difference of the measured amount of locally generated and consumed power, and triggering, by the control unit, the sending of the control signal indicating the ability of the one or more power autarkic network computing stations associated with the one or more local power generators to process IT-services, when the difference of the measured amount of locally generated and consumed power a predefined threshold level is reached or exceeded.

3. Method of controlling a network computing cluster providing IT-services according to claim 2, wherein the control signal comprises the amount of local power excess, and/or wherein the predefined threshold level indicates a minimal amount of local power excess required for processing of at least one IT-service.

4. Method of controlling a network computing cluster providing IT-services according to claim 3,
wherein the method comprises
rating, dependent on the amount of local power excess comprised in the control signal, the one or more power autarkic network computing stations providing the ability to process IT-services by assigning an ecological value to each of the one or more power autarkic network computing stations, and
selecting, by the resource managing unit, the one of the one or more power autarkic network computing stations for further processing the IT-service which provides a highest or better ecological value.

5. Method of controlling a network computing cluster providing IT-services according to claim 3,
wherein the method comprises:
evaluating, by the resource managing unit, the one or more power autarkic network computing stations for further processing the IT-service based on one or more parameters associated with the one or more power autarkic network computing stations which are selected from a group of the one or more parameters comprising the amount of local power excess and/or an ecological value, and
selecting, by the resource managing unit, the one of the one or more power autarkic network computing stations for further processing the IT-service which provides a best evaluation based on the one or more parameters.

6. Method of controlling a network computing cluster providing IT-services according to claim 2,
wherein the method comprises:
receiving, by a local resource management client of the one of the one or more power autarkic network computing stations, a status signal comprising the amount of local power excess via the communication network by means of communication means of the one of the one or more power autarkic network computing stations and extracting the amount of local power excess from the received status signal,
comparing, by the local resource management client, a number of two or more IT-services processed by a processing unit with a number of one or more powered-on processing blades of the one of the one or more power autarkic network computing stations, and
prompting, by the local resource management client, a local power controller to switch on or to switch off one or more processing blades of the one or more processing blades, respectively such that the number of one or more powered-on processing blades equals a minimum of a number of all processing blades of the processing unit, the number of the two or more IT-services processed by processing unit, and a floor of the amount of local power excess and an power consumption of one of the one or more powered-on processing blades multiplied with a factor of at least one, whereby the floor of the amount of power excess and an power consumption of one of the one or more powered-on processing blades multiplied with a factor of at least one defines a threshold value of minimum value of power excess necessary for processing at least one IT-service.

7. Method of controlling a network computing cluster providing IT-services according to claim 1,
wherein the method comprises:
controlling, by a local power controller of the one of the one or more power autarkic network computing stations, a supply of power to a processing unit with one or more processing blades of the one of the one or more power autarkic network computing stations based on an energy demand of the processing unit and based on responses to frequent queries regarding an amount of locally generated power by the one or more local power generators measured with a power sensor, whereby an accumulator of the one of the one or more power autarkic network computing stations is charged with power generated by the one or more local power generators while there is an power excess generated by the one or more local power generators and whereby the accumulator is discharged while the energy demand is higher than the power generated by the one or more local power generators in order to provide a constant supply of power to the processing unit.

8. Method of controlling a network computing cluster providing IT-services according to claim 1,
wherein the method comprises:
receiving, by a local resource management client of the one of the one or more power autarkic network computing stations, a power-off signal, preferably from a power switch, initiating, by the local resource management client, a transfer of all IT-services processed by a processing unit of the one of the one or more power autarkic network computing stations, querying, by the local resource management client, for one or more other network computing stations of the one or more network computing stations and/or for one or more other power autarkic network computing stations of the one or more power autarkic network computing stations which can take over said IT-services via the communication network for further processing said IT-services by means of communication means of the one of the one or more power autarkic network computing stations and transferring said IT-services according to a result of the query received from resource managing unit,
signaling, by the local resource management client, to the resource managing unit via the communication network that the one of the one or more power autarkic network computing stations is switched-off in order to indicated that the one of the one or more power autarkic network computing stations is performing a shutdown procedure, and
prompting, by the local resource management client, a local power controller of the one of the one or more power autarkic network computing stations to switch off the one of the one or more power autarkic network computing stations.

9. Method of controlling a network computing cluster providing IT-services according to claim 1,
wherein the method comprises:
signaling, by an accumulator charge condition sensor of an accumulator charged by the one or more associated local power generators, an accumulator charge condition value sensed by the accumulator charge condition sensor to a local power controller of the one of the one or more power autarkic network computing stations, signaling, by a local resource management client of the one of the one or more power autarkic network computing stations, a number of IT-services processed by a processing unit of the one of the one or more power autarkic network computing stations to the local power controller, and initiating, by the local power controller, a standby-mode of the one of the one or more power autarkic network computing stations in case that the number of IT-services processed by a processing unit equals zero and the sensed accumulator charge condition value indicates a fully charged accumulator, whereby the processing unit of the one of the one or more power autarkic network computing stations is not powered during standby-mode.

10. Method of controlling a network computing cluster providing IT-services according to claim 1, wherein the method comprises:

assigning, by the resource managing unit, one or more further IT-services to the one and/or another of the one or more power autarkic network computing stations, the one and/or the other of the one or more power autarkic networks computing station comprising a processing unit with one or more processing blades for processing the one or more further IT-services, via the communication network, and instantiating, by a local resource management client of the one and/or the other of the one or more power autarkic network computing stations, at one of the one or more processing blades the one or more further IT-services for processing the one or more further IT-services.

11. Method of controlling a network computing cluster providing IT-services according to claim 1, wherein the method comprises:

receiving, by said network computing station, the signal for transferring said IT-service processed by said network computing station via the communication network by means of communication means of said network computing station, sending, by said network computing station, to the resource managing unit a confirmation signal comprising status data of said IT-service via the communication network, receiving, by the resource managing unit, the confirmation signal comprising the status data of said IT-service, and forwarding, by the resource managing unit, the status data of said IT-service to the one of the one or more power autarkic network computing stations for the further processing the IT-service via the communication network.

12. A network computing cluster providing IT-services, the network computing comprising a control unit, a resource managing unit, one or more network computing stations and one or more power autarkic network computing stations supplied by one or more associated local power generators, the one or more power autarkic network computing stations and the one or more local power generators being connected with a local power network, wherein the control unit is adapted to determine an amount of locally generated power generated by the one or more local power generators and, dependent on the determined amount of locally generated power, trigger one of the one or more power autarkic network computing stations to send a control signal to the resource managing unit via a communication network, the control signal indicating the ability of the one or more power autarkic network computing stations to process IT-services, and wherein the resource managing unit is adapted to receive said control signal via the communication network, and send, triggered by said control signal, a signal for transferring an IT-service processed by a network computing station of the one or more network computing stations to said network computing station via the communication network for transferring said IT-service processed by said network computing station to the one of the one or more power autarkic network computing stations via the communication for further processing the IT-service.

* * * * *